United States Patent [19]

McNaughton

[11] Patent Number: 5,476,321
[45] Date of Patent: Dec. 19, 1995

[54] CONTAINER STIRRING DEVICE

[76] Inventor: Betty McNaughton, 510 Albert Pl., New Milford, N.J. 07646

[21] Appl. No.: 417,260

[22] Filed: Apr. 5, 1995

[51] Int. Cl.[6] .................................................. B01F 11/00
[52] U.S. Cl. ........................................ 366/261; 366/241
[58] Field of Search .......................... 366/65, 197, 241, 366/255, 256, 257, 258, 332, 334, 335

[56] References Cited

U.S. PATENT DOCUMENTS

| | | | |
|---|---|---|---|
| 765,710 | 7/1904 | Pullen | 366/332 |
| 1,704,025 | 3/1929 | Wahl | 366/197 |
| 2,281,094 | 4/1942 | Chambers | 366/332 |
| 3,820,763 | 6/1974 | Questi, Jr. | 366/65 |
| 5,145,250 | 9/1992 | Planck | 366/197 |

FOREIGN PATENT DOCUMENTS

| | | | |
|---|---|---|---|
| 293722 | 6/1913 | Germany | 366/197 |
| 584452 | 10/1958 | Italy | 366/197 |

*Primary Examiner*—David Scherbel
*Assistant Examiner*—Randall E. Chin

[57] ABSTRACT

A stirring device for mixing a liquid within a container. The inventive device includes a support base portably positionable adjacent a container. An articulating assembly extends from the support base for supporting and oscillating a stirring implement projecting into the container so as to stir the contents thereof.

2 Claims, 3 Drawing Sheets

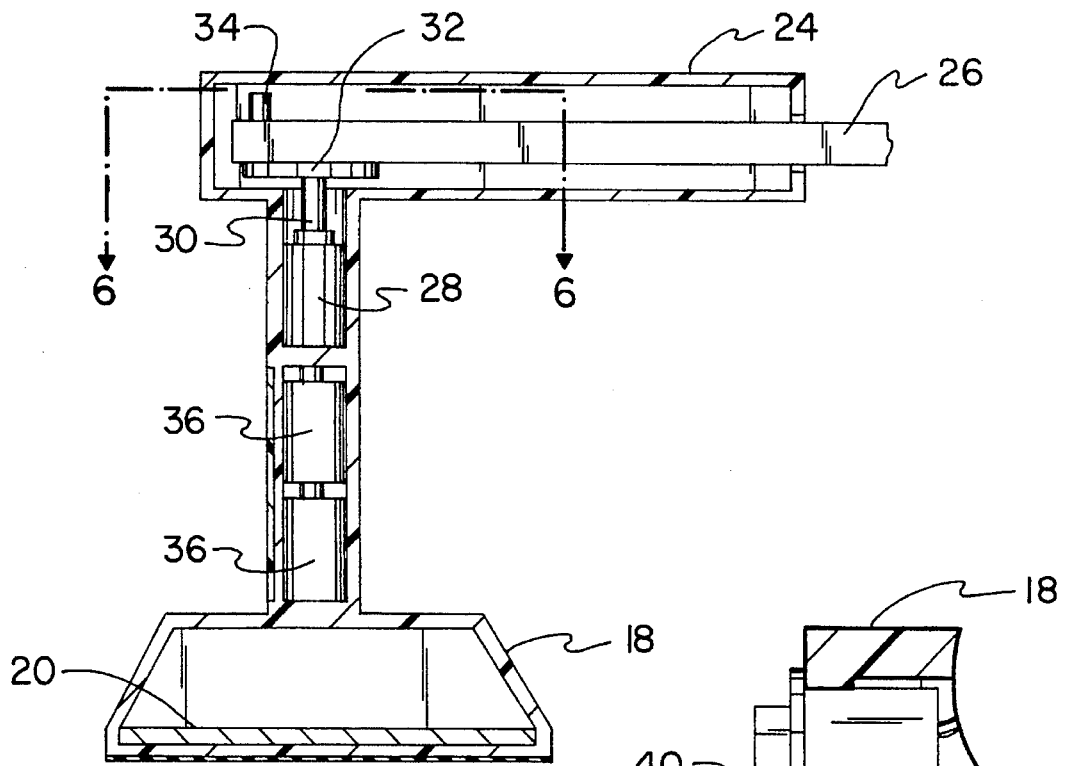
FIG.4
FIG.5
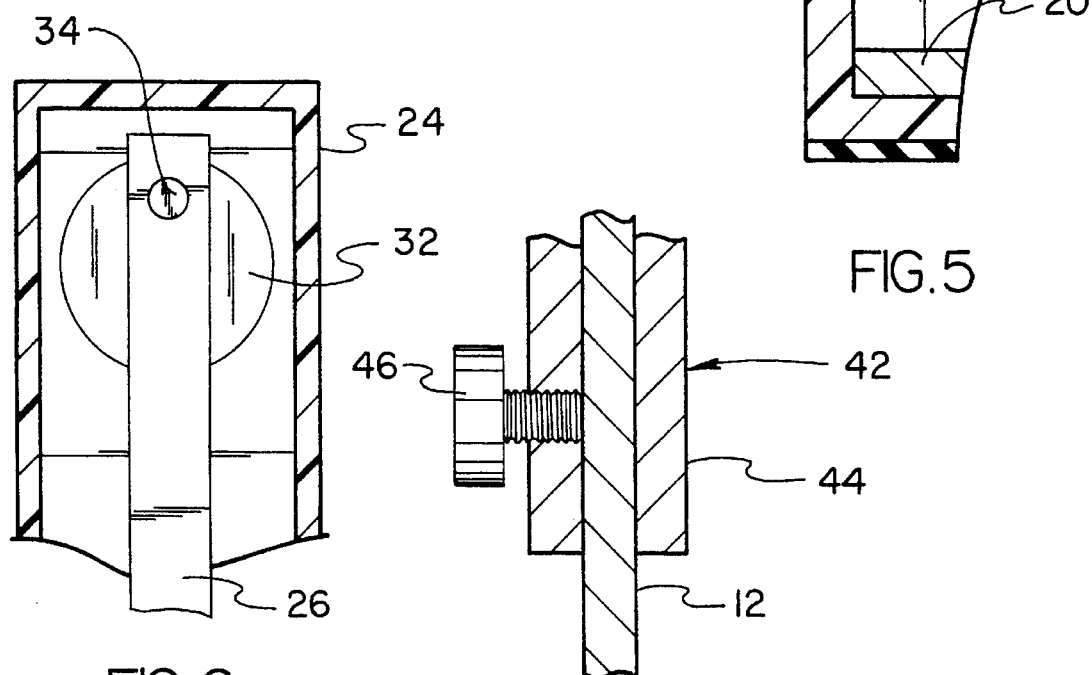
FIG.6
FIG.7

CONTAINER STIRRING DEVICE

BACKGROUND OF THE INVENTION

1. Field of the Invention

The present invention relates to liquid agitators and more particularly pertains to an container stirring device for mixing a liquid within a container.

2. Description of the Prior Art

The use of liquid agitators is known in the prior art. More specifically, liquid agitators heretofore devised and utilized are known to consist basically of familiar, expected and obvious structural configurations, notwithstanding the myriad of designs encompassed by the crowded prior art which have been developed for the fulfillment of countless objectives and requirements.

Known prior art liquid agitators include U.S. Pat. Nos. 3,656,974; 4,339,992; 4,820,054; 4,856,910; 5,022,315; 5,193,441; and 5,259,300.

While these devices fulfill their respective, particular objectives and requirements, the aforementioned patents do not disclose a container stirring device for mixing a liquid within a container which includes a support base portably positionable adjacent a container, and an articulating means extends from the support base for supporting and oscillating a stirring implement projecting into the container so as to stir the contents thereof.

In these respects, the container stirring device according to the present invention substantially departs from the conventional concepts and designs of the prior art, and in so doing provides an apparatus primarily developed for the purpose of mixing a liquid within a container.

SUMMARY OF THE INVENTION

In view of the foregoing disadvantages inherent in the known types of liquid agitators now present in the prior art, the present invention provides a new container stirring device construction wherein the same can be utilized for mixing a liquid within a container. As such, the general purpose of the present invention, which will be described subsequently in greater detail, is to provide a new container stirring device apparatus and method which has many of the advantages of the liquid agitators mentioned heretofore and many novel features that result in a container stirring device which is not anticipated, rendered obvious, suggested, or even implied by any of the prior art liquid agitators, either alone or in any combination thereof.

To attain this, the present invention generally comprises a stirring device for mixing a liquid within a container. The inventive device includes a support base portably positionable adjacent a container. An articulating assembly extends from the support base for supporting and oscillating a stirring implement projecting into the container so as to stir the contents thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new container stirring device apparatus and method which has many of the advantages of the liquid agitators mentioned heretofore and many novel features that result in a container stirring device which is not anticipated, rendered obvious, suggested, or even implied by any of the prior art liquid agitators, either alone or in any combination thereof.

It is another object of the present invention to provide a new container stirring device which may be easily and efficiently manufactured and marketed.

It is a further object of the present invention to provide a new container stirring device which is of a durable and reliable construction.

An even further object of the present invention is to provide a new container stirring device which is susceptible of a low cost of manufacture with regard to both materials and labor, and which accordingly is then susceptible of low prices of sale to the consuming public, thereby making such container stirring devices economically available to the buying public.

Still yet another object of the present invention is to provide a new container stirring device which provides in the apparatuses and methods of the prior art some of the advantages thereof, while simultaneously overcoming some of the disadvantages normally associated therewith.

Still another object of the present invention is to provide a new container stirring device for mixing a liquid within a container.

Yet another object of the present invention is to provide a new container stirring device which includes a support base portably positionable adjacent a container, and articulating means extending from the support base for supporting and oscillating a stirring implement projecting into the container so as to stir the contents thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a cross sectional taken along line 4—4 of FIG. 3.

FIG. 5 is a cross sectional view taken along line 5—5 of FIG. 2.

FIG. 6 is a cross sectional view taken along line 6—6 of FIG. 4.

FIG. 7 is an enlarged cross sectional view of the area set forth in FIG. 3.

DESCRIPTION OF THE PREFERRED EMBODIMENT

Figure 1:
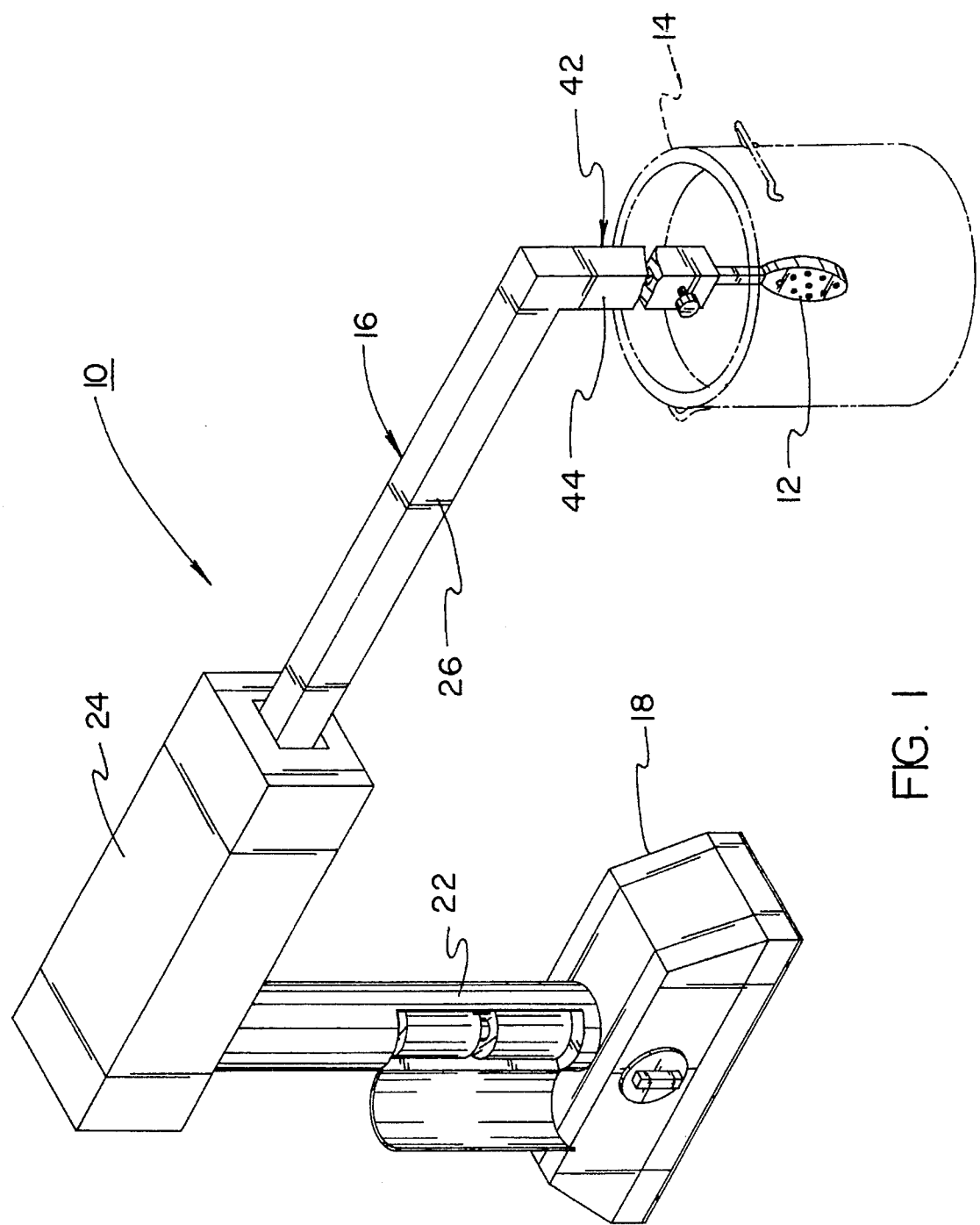
FIG. 1 is an isometric illustration of a container stirring device according to the present invention in use.

With reference now to the drawings, and in particular to FIGS. 1–7 thereof, a new container stirring device embodying the principles and concepts of the present invention and generally designated by the reference numeral 10 will be described.

More specifically, it will be noted that the container stirring device 10 comprises a stirring implement 12 for positioning within a container 14, whereby oscillation or articulation of the stirring implement will effect stirring and agitating of contents within the container. An articulating means 16 is coupled to the stirring implement 12 and portably positionable adjacent the container 14 for articulating and oscillating the stirring implement 12 within the container so as to agitate the contents thereof. By this structure, a container 14 such as a pot utilized in a cooking procedure can be continuously stirred while left unattended by an operator.

Figure 2:
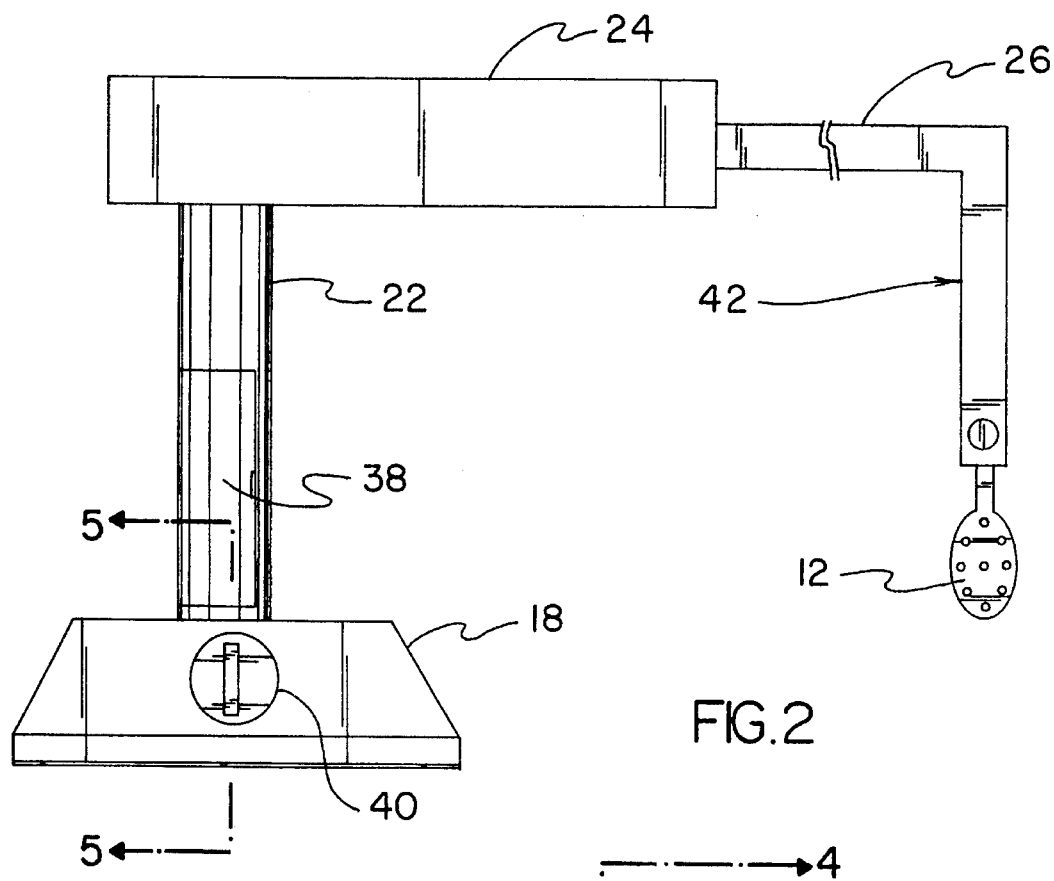
FIG. 2 is a side elevation view of the present invention, per se.
Figure 3:
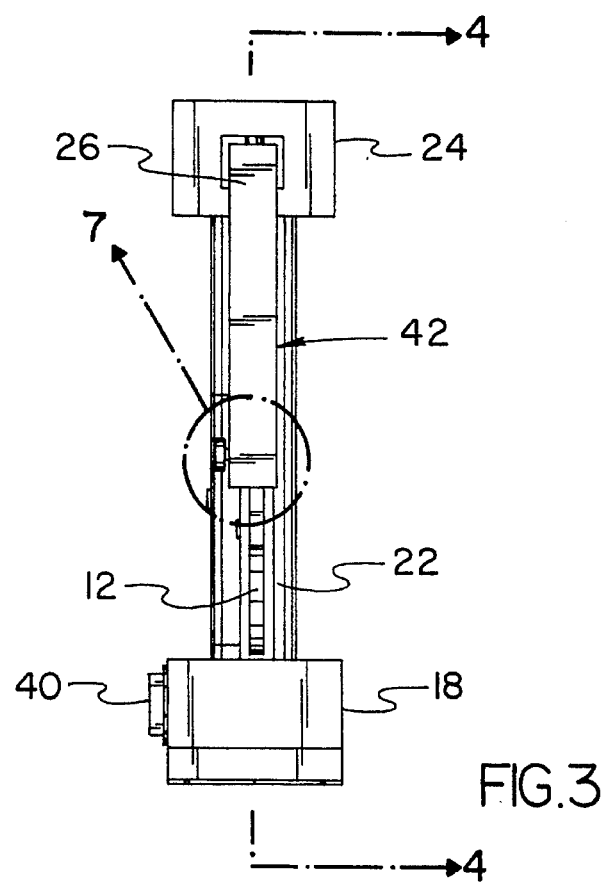
FIG. 3 is an end elevation view thereof.

As best illustrated in FIGS. 1 through 3, it can be shown that the articulating means 16 according to the present invention 10 preferably comprises a support base 18 positionable adjacent the container 14, such as onto an adjacent counter top proximal to a stove or other heating source. The support base 18, as shown in FIGS. 4 and 5 of the drawings includes a weight 20 positioned therewithin and serves to maintain the device in the vertical orientation illustrated in FIG. 1. A vertical stanchion 22 projects from the support base 18 into a substantially vertical orientation and terminates in an upper distal end. An arm receiver 24 is orthogonally mounted to the vertical stanchion 22 and includes an unlabeled aperture through which a stirring arm 26 projects so as to reside partially within the arm receiver. A motor 28 mounted within the vertical stanchion 22 includes a motor shaft 30 projecting into the arm receiver 24. A crank 32 is coupled to the motor shaft 30 within the arm receiver 24 and includes eccentric crank rod 34 rotatably coupled to an inner end of the stirring arm 26. At least one battery 36 is removably positioned within the vertical stanchion 22 behind a pivotally coupled access cover 38 (see FIG. 2) permitting selective removal and replacement of the battery as deemed necessary by an end user. As shown in FIG. 5, a control switch 40 is mounted to the support base 18 and electrically coupled to the motor 28 and the batteries 36 such that a manual activation of the control switch will effect energization of the motor 28 by the batteries 36 to cause the crank 32 to rotate. As shown in FIG. 6, a rotation of the crank 32 will effect rotating of the eccentric crank rod 34 through an annular arc, thereby causing oscillation of the stirring arm 26 relative to the arm receiver 24. Such oscillation of the stirring arm 26 manifests an oscillating movement of an outer distal end of the stirring arm 26 whereat a coupling means 42 is mounted for coupling the stirring implement 12 to the outer distal end of the stirring arm 26. By this structure, an energization of the motor 28 through a manual operation of the control switch 40 will effect oscillation of the stirring implement 12 within an associated container 14. Preferably, the control switch 40 further includes speed control means for selectively controlling a rotational speed of the motor shaft 30 of the motor 28 so as to control the period of oscillation of the stirring implement 12.

Referring now to FIG. 7 with concurrent reference to FIG. 1, it can be shown that the coupling means 42 according to the present invention 10 preferably comprises a depending receiver 44 coupled to the outer end of the stirring arm 26 and extending downwardly therefrom. The depending receiver 44 is shaped so as to define an unlabeled interior cavity within which a portion of the stirring implement 12 can be extended. A securing fastener 46 is threadably directed through the depending receiver and rotatably advancable into frictional engagement with the stirring implement 12 so as to retain the stirring implement relative to the coupling means 42 as desired.

In use, the container stirring device 10 according to the present invention can be easily utilized to effect agitation and/or stirring of the contents of a container 14. Because the device 10 is constructed so as to operate on replaceable batteries 36, the device can be portably positioned adjacent to a container 14 at any location. Alternatively, it is within the intent and purview of the present invention to provide suitable electrical connections for coupling the motor 28 to a standard household electrical outlet if so desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A container stirring device comprising:

stirring implement for positioning within a container;

an articulating means coupled to the stirring implement and portably positionable adjacent the container for oscillating the stirring implement within the container wherein the articulating means comprises a support base; a weight positioned within the support base; a vertical stanchion projecting from the support base and terminating in an upper distal end; an arm receiver mounted to the upper distal end of the vertical stanchion and including an aperture directed therethrough; a stirring arm projecting through the aperture of the arm receiver and thereinto so as to reside partially within the arm receiver, said stirring arm having an inner end and outer distal end; motor means for effecting oscillation of the stirring arm relative to the arm receiver wherein the motor means comprises a motor including a motor shaft projecting into the arm receiver; a crank coupled to the motor shaft within the arm receiver and including an eccentric crank rod rotatably coupled to the inner end of the stirring arm; a control switch electrically connected to the motor and electrically coupled to a battery; and a coupling means mounted to the outer distal end of the stirring arm for coupling the stirring implement to the outer distal end of the stirring arm.

2. The container stirring device of claim 1, wherein the coupling means comprises a depending receiver coupled to the outer distal end of the stirring arm and extending downwardly therefrom, the depending receiver being shaped so as to define an interior cavity within which a portion of the stirring implement is positioned; and a securing fastener threadably directed through the depending receiver and rotatably advanced into frictional engagement with the stirring implement so as to retain the stirring implement relative to the coupling means.

\* \* \* \* \*